(12) United States Patent
Ono et al.

(10) Patent No.: US 11,425,971 B2
(45) Date of Patent: Aug. 30, 2022

(54) SHAPED HOOK MEMBER OF HOOK-AND-LOOP FASTENER WITH EXCELLENT HEAT RESISTANCE, PROCESS FOR PRODUCING SAID SHAPED HOOK MEMBER OF HOOK-AND-LOOP FASTENER, AND METHOD FOR FIXING INTERIOR AUTOMOTIVE MATERIAL WITH SAID SHAPED HOOK MEMBER OF HOOK-AND-LOOP FASTENER

(71) Applicant: KURARAY FASTENING CO., LTD., Osaka (JP)

(72) Inventors: Satoru Ono, Sakai (JP); Nobuhiro Koga, Kurashiki (JP); Toshiaki Hasegawa, Tsukuba (JP)

(73) Assignee: KURARAY FASTENING CO., LTD., Osaka (JP)

( * ) Notice: Subject to any disclaimer, the term of this patent is extended or adjusted under 35 U.S.C. 154(b) by 0 days.

(21) Appl. No.: 17/286,245

(22) PCT Filed: Oct. 21, 2019

(86) PCT No.: PCT/JP2019/041258
§ 371 (c)(1),
(2) Date: Apr. 16, 2021

(87) PCT Pub. No.: WO2020/085208
PCT Pub. Date: Apr. 30, 2020

(65) Prior Publication Data
US 2021/0337937 A1   Nov. 4, 2021

(30) Foreign Application Priority Data
Oct. 22, 2018   (JP) .............................. JP2018-198336

(51) Int. Cl.
*A44B 18/00*   (2006.01)

(52) U.S. Cl.
CPC .............................. *A44B 18/0061* (2013.01)

(58) Field of Classification Search
CPC .................................................. A44B 18/0061
See application file for complete search history.

(56) References Cited

U.S. PATENT DOCUMENTS 5,878,468 A * 3/1999 Tomic ...................... B26F 1/12
24/585.12
5,887,320 A * 3/1999 Provost .............. A44B 18/0049
24/442

(Continued)

FOREIGN PATENT DOCUMENTS

JP   2000-204239 A   7/2000
JP   2003-245108 A   9/2003

(Continued)

OTHER PUBLICATIONS

English Translation of Written Opinion of PCT/JP2019/041258, dated Jan. 28, 2020 (Year: 2020).*

(Continued)

*Primary Examiner* — Jason W San
(74) *Attorney, Agent, or Firm* — Oblon, McClelland, Maier & Neustadt, L.L.P.

(57) ABSTRACT

A shaped hook member of hook-and-loop fastener including a base plate and a plurality of hook-type engaging elements that rise from a surface of the base plate. The hook-type engaging elements are each tapered from the proximal end to the distal end, and are each curved from a point in the course from the proximal end to the distal end, and the distal end is directed toward the base plate. The plurality of hook-type engaging elements are arranged in rows extending in the same direction as the curving direction of the hook-type engaging elements, and the curving directions of the hook-type engaging elements in two adjacent rows or two adjacent units each of two or more rows are opposite to (Continued)

each other. The base plate and the hook-type engaging element are formed of a semi-aromatic polyamide resin containing a semi-aromatic polyamide and an elastomer.

9 Claims, 2 Drawing Sheets

(56) References Cited

U.S. PATENT DOCUMENTS

| | | | | |
|---|---|---|---|---|
| 5,900,350 | A * | 5/1999 | Provost | B29C 33/42 430/326 |
| 5,985,406 | A * | 11/1999 | Takizawa | A44B 18/0061 24/444 |
| 6,061,881 | A * | 5/2000 | Takizawa | A44B 18/0061 24/446 |
| 6,127,018 | A * | 10/2000 | Akeno | B29C 43/222 24/442 |
| 6,209,177 | B1 * | 4/2001 | Murasaki | B29C 48/12 24/442 |
| 6,460,229 | B1 | 10/2002 | Schulte | |
| 7,304,104 | B2 * | 12/2007 | Yamashita | C08F 290/14 24/376 |
| 9,072,343 | B1 * | 7/2015 | Ogilvie | B65D 63/10 |
| 2002/0164449 | A1 * | 11/2002 | Fujisawa | B29C 48/05 264/239 |
| 2003/0186021 | A1 | 10/2003 | Tanaka et al. | |
| 2004/0088835 | A1 * | 5/2004 | Tachauer | A44B 18/0096 24/451 |
| 2004/0194262 | A1 * | 10/2004 | Kurtz, Jr. | A44B 18/0061 24/452 |
| 2004/0258902 | A1 * | 12/2004 | Seth | A44B 18/0061 428/315.7 |
| 2005/0081342 | A1 * | 4/2005 | Erickson | D04B 21/02 24/451 |
| 2005/0081345 | A1 * | 4/2005 | Tolan | A44B 18/0061 24/452 |
| 2008/0289157 | A1 * | 11/2008 | Higashinaka | A44B 18/0023 139/420 R |
| 2009/0013506 | A1 * | 1/2009 | Mizuhara | A44B 18/0069 24/442 |
| 2010/0043183 | A1 * | 2/2010 | Higashinaka | A44B 18/0038 24/452 |
| 2011/0111165 | A1 * | 5/2011 | Mahe | B29C 45/372 425/588 |
| 2012/0074275 | A1 * | 3/2012 | Chang | F16M 13/022 248/205.2 |
| 2015/0343681 | A1 * | 12/2015 | Mizumoto | B29C 45/0001 24/381 |
| 2016/0107353 | A1 * | 4/2016 | Poulakis | A44B 13/0052 24/442 |
| 2017/0013918 | A1 * | 1/2017 | Ren | B60N 2/5833 |
| 2018/0008011 | A1 * | 1/2018 | Cheng | B65D 33/00 |
| 2018/0228254 | A1 * | 8/2018 | Cheng | A44B 18/0015 |
| 2018/0368535 | A1 * | 12/2018 | Gilbert | A44B 18/0061 |
| 2019/0016023 | A1 * | 1/2019 | Parellada Armela | B29C 43/46 |
| 2019/0090595 | A1 * | 3/2019 | Fleming | A44B 18/0049 |
| 2020/0015552 | A1 * | 1/2020 | Shimizu | A44B 18/0061 |
| 2020/0047650 | A1 * | 2/2020 | Cheng | B60N 2/5833 |
| 2020/0323313 | A1 * | 10/2020 | Abe | A44B 18/0049 |
| 2021/0378367 | A1 * | 12/2021 | Gilbert | A44B 18/0061 |

FOREIGN PATENT DOCUMENTS

| | | |
|---|---|---|
| JP | 2014-122545 | 7/2014 |
| JP | 2016-94029 A | 5/2016 |
| WO | WO 2012/014667 A1 | 2/2012 |

OTHER PUBLICATIONS

International Search Report dated Jan. 28, 2020 in PCT/JP2019/041258 filed Oct. 21, 2019, 2 pages.
Extended European Search Report dated Jun. 30, 2022 in PCT/JP2019041258 filed Oct. 21, 2019, 8 pages.

* cited by examiner

SHAPED HOOK MEMBER OF HOOK-AND-LOOP FASTENER WITH EXCELLENT HEAT RESISTANCE, PROCESS FOR PRODUCING SAID SHAPED HOOK MEMBER OF HOOK-AND-LOOP FASTENER, AND METHOD FOR FIXING INTERIOR AUTOMOTIVE MATERIAL WITH SAID SHAPED HOOK MEMBER OF HOOK-AND-LOOP FASTENER

TECHNICAL FIELD

The present invention relates to a shaped hook member of hook-and-loop fastener (molded male-type hook-and-loop fastener) in which the engaging force does not decrease even under a high temperature condition, in which even after engaging and peeling are repeated, the loop-shaped engaging elements of the female-type hook-and-loop fastener to be engaged therewith are less likely to be cut and the engaging force is less likely to decrease, and in which in molding thereof, the hook-type engaging elements are less likely to be cut and a crack and the like is less likely to be generated in the curved portions of the engaging elements. The present invention also relates to a method for producing the same and a method for fixing an automotive interior material using the excellent performance thereof.

BACKGROUND ART

As a means for attaching an object to a surface of an article, a method has conventionally been used in which a male-type hook-and-loop fastener including hook-type engaging elements is fixed to a surface of either the article or the object, a female-type hook-and-loop fastener including loop-type engaging elements is fixed to a surface of the other of the article and the object, and the engaging element sides of the two hook-and-loop fasteners are superposed on each other to allow the engaging elements of the two fasteners to engage with each other, thereby fixing the object to the surface of the article.

Also in the automotive field, as a means for attaching and fixing an interior material for ceiling to a car body, a combination of a male-type hook-and-loop fastener and a female-type hook-and-loop fastener is used. For example, PTL 1 discloses, as a male-type hook-and-loop fastener to be used for attaching and fixing an interior material for car ceiling with a hook-and-loop fastener, a shaped hook member of hook-and-loop fastener produced from a common thermoplastic resin, such as a polyolefin, a polyester, or a nylon resin.

However, in the case of a shaped hook member of hook-and-loop fastener of a common thermoplastic resin, when the fastener is installed under a high temperature environmental condition, there arises a problem of decrease in the engaging force. When the fastener is left under a high temperature condition for a long period of time, the engaging force further decreases gradually.

Furthermore, cases where a filter, a heat insulating material, or the like is fixed with a hook-and-loop fastener have recently been increased also in the field other than the automobile field, for example, the fields of high temperature dustproof filter, heat insulating material for high temperature piping, and the like. As a hook-and-loop fastener for use in such applications, there is a need for a hook-and-loop fastener in which the engaging force does not decrease under a high temperature condition, and furthermore, in which the engaging force does not decrease even when the fastener is used under a high temperature condition for a long period of time.

As a resin having sufficient heat resistance for use in a high temperature atmosphere, PTL 2 introduces a semi-aromatic polyamide containing 1,9-nonanediamine and 2-methyl-1,8-octanediamine as diamine components and terephthalic acid as an aromatic dicarboxylic acid component, and lists a huge number of applications of the semi-aromatic polyamide resin. As one of them, the usability as a fastener is described.

However, the term "fastener" generally often means a slide fastener and rarely means a hook-and-loop fastener. The description of simple "fastener" does still not immediately evoke such a shaped hook member of hook-and-loop fastener that the present invention is intended to provide.

Specifically, hook-and-loop fasteners include two types of male-type hook-and-loop fasteners and female-type hook-and-loop fasteners. The male-type hook-and-loop fasteners are further roughly divided into the following two types: fabric male-type hook-and-loop fasteners including a base fabric of a woven or knit material and a plurality of hook-shaped or mushroom-shaped engaging elements which are formed of monofilaments woven into the base fabric and which are upwardly provided on a surface of the base fabric; and shaped hook members of hook-and-loop fasteners including a base plate of a plastic and a plurality of stems of the same plastic which are upwardly provided on the base plate, the distal ends of the stems each having a mushroom shape, arrowhead shape, or hook shape. The shaped hook members of hook-and-loop fasteners further include various types, such as one obtained by an extrusion method and one obtained by an injection molding method.

Among such hook members of hook-and-loop fasteners, the fabric male-type hook-and-loop fasteners include one obtained by weaving monofilaments which are to become hook-type engaging elements into a woven base fabric, allowing the monofilaments to rise from some points of the base fabric surface in a loop shape, and cutting one leg of each loop to make a hook shape, and one obtained by melting the distal end of the loop to make a mushroom shape. However, since the engaging elements are formed of monofilaments, the thickness of the monofilaments that can be woven, namely, the thickness of the engaging elements is limited and thus, a hook-and-loop fastener having a high engaging force under a high temperature condition is unfortunately hardly obtained.

When a shaped hook member of hook-and-loop fastener is produced using the semi-aromatic polyamide resin by the extrusion method, specifically, by a method in which a tape-shaped body having on a surface thereof continuous strips with an engaging element-shaped cross section is extruded from a nozzle, incisions are made in the continuous strips on the surface in the direction perpendicular to the longitudinal direction of the tape-shaped body, and the tape-shaped body is stretched to expand the incisions, thereby converting the continuous strips into rows of male-type engaging elements, the following problems have been found: when engaging and peeling are repeated using the resulting shaped hook member of hook-and-loop fastener, the loop-type engaging elements of a female-type hook-and-loop fastener to be engaged are likely to be cut, resulting in a rapid decrease in the engaging force; and top portions of the engaging elements are likely to be cut off from the shafts of the engaging elements by the repeated engaging and peeling.

When a shaped hook member of hook-and-loop fastener is produced using the semi-aromatic polyamide resin by the injection molding method, specifically, by a method in which a surface of a metal roll that has on the surface a plurality of engaging element-shaped cavities is covered in a sheet form with the semi-aromatic polyamide resin molten, and at the same time, the molten semi-aromatic polyamide resin is pressure-injected into the cavities, and then, after the semi-aromatic polyamide resin is solidified, the sheet of the semi-aromatic polyamide resin is peeled from the metal roll surface, and at the same time, the semi-aromatic polyamide resin is pulled out of the cavities, the following problems have been found: while the solidified hook-type engaging elements are pulled out of the cavities, the hook-type engaging elements are cut in the cavities; and even if the hook-type engaging elements can be pulled with no problem, cracks are generated at the curved portions of the hook-type engaging elements, and when engaging and peeling are repeated, the engaging elements are cut at the crack points.

CITATION LIST

Patent Literature

PTL 1: WO 2012/014667
PTL 2: JP 2000-204239 A

SUMMARY OF INVENTION

Technical Problem

The present invention has an object to provide a shaped hook member of hook-and-loop fastener which is formed of a semi-aromatic polyamide resin which is excellent in heat resistance, and in which the engaging force does not decrease particularly even under a high temperature condition among other various male-type hook-and-loop fasteners, and in which it is less likely to occur that loop-type engaging elements of a female-type hook-and-loop fastener to be engaged are cut by repeated engaging and peeling to thereby decrease the engaging force, and in which in molding thereof, the hook-type engaging elements are not cut and no crack is generated.

Solution to Problem

Specifically, the present invention relates to a shaped hook member of hook-and-loop fastener that comprises a base plate and a plurality of hook-type engaging elements that rise from a surface of the base plate, the shaped hook member of hook-and-loop fastener satisfying the following conditions: (1) to (3):
(1) the hook-type engaging elements are each tapered from a proximal end to a distal end and are each curved from a point in the course from the proximal end to the distal end, and the distal end is directed toward the base plate;
(2) the plurality of hook-type engaging elements are arranged in rows extending in the same direction as the curving directions of the hook-type engaging elements, and the curving directions of the hook-type engaging elements in two adjacent rows or two adjacent units each of two or more rows are opposite to each other; and
(3) the base plate and the hook-type engaging elements are formed of a resin, the resin being a semi-aromatic polyamide resin containing a semi-aromatic polyamide and 2 to 20% by mass of an elastomer based on 100% by mass of the semi-aromatic polyamide.

Preferably, in the shaped hook member of hook-and-loop fastener, the hook-type engaging element has in a top portion a cross-sectional shape in which the width of the hook-type engaging element is larger than the thickness of the hook-type engaging element, and more preferably, the lower end of the hook-type engaging element at the distal end is 2 to 8% closer to the base plate than the lower end of the hook-type engaging element in the top portion based on the height of the hook-type engaging element.

Further preferably, the semi-aromatic polyamide contained in the semi-aromatic polyamide resin is a polyamide derived from 1,9-nonanediamine and terephthalic acid as main components, and further preferably, the semi-aromatic polyamide contained in the semi-aromatic polyamide resin is a terminal amino group-containing semi-aromatic polyamide derived from 1,9-nonanediamine and 2-methyl-1,8-octanediamine as diamine components and terephthalic acid as a dicarboxylic acid component, and the elastomer is maleic anhydride-modified polyolefin elastomer. Particularly preferably, the semi-aromatic polyamide resin comprises carbon black.

Furthermore preferably, in the shaped hook member of hook-and-loop fastener, a polyurethane primer is laminated on the back surface of the base plate of the shaped hook member of hook-and-loop fastener.

The present invention further relates to a method for producing a shaped hook member of hook-and-loop fastener, the method comprising: covering a surface of a metal roll that has on the surface a plurality of hook-type engaging element-shaped cavities satisfying the following conditions (4) and (5) with a molten resin satisfying the following conditions (6) in a sheet form, and at the same time, pressure-injecting the molten resin into the cavities; and after the pressure-injected resin is solidified, peeling the sheet-shaped resin from the surface of the metal roll, and at the same time, pulling the solidified resin out of the cavities:
(4) the cavities are each tapered from the surface of the metal roll to a distal end, and are each curved from a point in the course from the surface of the metal roll to the distal end in a circumferential direction of the metal roll, and the distal end is directed toward the surface of the metal roll;
(5) on the surface of the metal roll, the plurality of cavities are arranged in rows extending in the circumferential direction of the metal roll, the rows are a plurality of rows present in a width direction of the metal roll, and the curving direction of the cavities in two adjacent rows or two adjacent units each of two or more rows are opposite to each other;
(6) the molten resin is a semi-aromatic polyamide resin containing a semi-aromatic polyamide and 2 to 20% by mass of an elastomer based on 100% by mass of the semi-aromatic polyamide.

The present invention also relates to a method for fixing an automotive interior material, the method comprising fixing the automotive interior material on a car ceiling with the shaped hook member of hook-and-loop fastener.

Advantageous Effects of Invention

In the present invention, the hook-type engaging elements of the shaped hook member of hook-and-loop fastener have a certain shape, and furthermore, a certain polymer is blended into the semi-aromatic polyamide resin used for molding, whereby, while the hook-type engaging elements are pulled out of the cavities, the hook-type engaging elements are hardly cut in the cavities and furthermore, a crack is hardly generated in the curved portions of the hook-type engaging elements.

In particular, the hook-type engaging elements preferably have such a shape that a top portion of the hook-type engaging element has a cross-sectional shape in which the width of the hook-type engaging element is larger than the thickness of the hook-type engaging element. In other words, the top portion preferably has a thin shape along the base plate surface direction. The hook-type engaging elements also preferably have such a shape that the lower end of the hook-type engaging element at the distal end is 2 to 8% closer to the base plate than the lower end of the hook-type engaging element in the top portion based on the height of the hook-type engaging element. In other words, the degree of the curving is preferably low. In the above preferred aspect, while the hook-type engaging elements are pulled out of the cavities, the breakage or cutting of the hook-type engaging elements in the cavities is largely eliminated, and furthermore, the crack generation in the curved portions of the hook-type engaging elements is largely eliminated.

Conventionally, in the case of a shaped hook member of hook-and-loop fastener obtained by injection molding, for increasing the engaging force, the hook-type engaging elements have had a shape in which the width of the hook-type engaging element is smaller than the thickness of the hook-type engaging element, and furthermore, the degree of curving of the hook-type engaging elements has been increased so that the distal ends of the hook-type engaging elements are largely closer to the base plate surface in many cases (see, for example, JP 2011-224323 A). However, when the resin for molding is a semi-aromatic polyamide, it is difficult, in such hook-type engaging elements that have conventionally been adopted, to prevent the cutting of or crack generation in the hook-type engaging elements in molding.

Furthermore, in the present invention, an elastomer is blended into a semi-aromatic polyamide to thus obtain a semi-aromatic polyamide resin containing the semi-aromatic polyamide and the elastomer, whereby the cutting of or crack generation in the hook-type engaging elements in molding is prevented. In particular, when the elastomer is a maleic anhydride-modified polyolefin elastomer and the semi-aromatic polyamide is a terminal amino group-containing semi-aromatic polyamide derived from 1,9-nonanediamine and 2-methyl-1,8-octaneciamine as diamine components and terephthalic acid as a dicarboxylic acid component, the effect is significant.

When carbon black is further added (blended) into the semi-aromatic polyamide resin (the semi-aromatic polyamide resin contains carbon black), there is a regulatory effect on the crystal solidification rate of the semi-aromatic polyamide resin. As a result, by adjusting the amount of the carbon black added, the molten resin can enter in every detail of cavities, and the shape of the cavities can be faithfully reproduced, whereby desired hook-type engaging elements can be obtained. In addition to that, the reduction in the performance of the hook-and-loop fastener at high temperature due to the elastomer which is blended 2 to 20% by mass based on 100% by mass of the semi-aromatic polyamide is hardly caused.

In addition, the shaped hook member of hook-and-loop fastener of the present invention is a shaped hook member of hook-and-loop fastener obtained by a method in which a molten resin is poured on a metal roll surface having a plurality of cavities, and after solidification, the resin is peeled from the metal roll surface, what is called injection molding. Accordingly, as compared with a hook-and-loop fastener obtained by the extrusion method as described above, a trouble of the cutting of loop-shaped engaging elements of a female-type hook-and-loop fastener to be engaged due to repeated engaging and peeling, resulting in a decrease in the engaging force, and a trouble of the cutting of the head portions of hook-type engaging elements from the shafts thereof due to repeated engaging and peeling are less likely to occur.

DESCRIPTION OF EMBODIMENTS

The present invention will be described in detail below with reference to the drawings.

Figure 1:
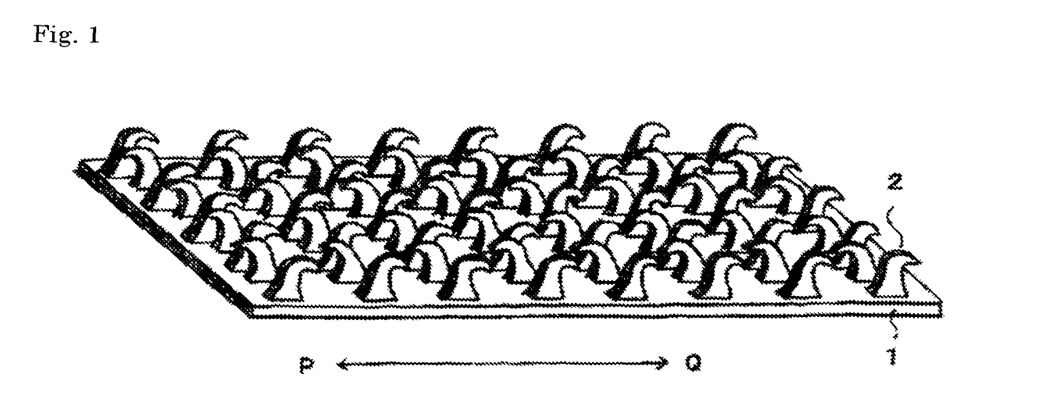
FIG. 1 is a schematic perspective view illustrating an example of the shaped hook member of hook-and-loop fastener of the present invention.
Figure 2:
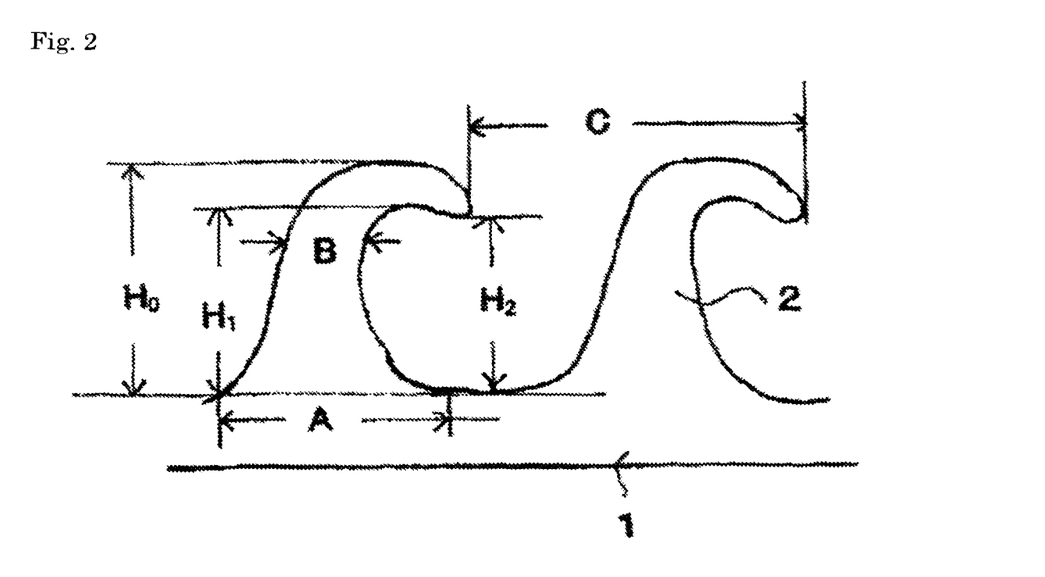
FIG. 2 is a side view illustrating an example of the hook-type engaging elements constituting the shaped hook member of hook-and-loop fastener of the present invention.

FIG. 1 is a schematic perspective view illustrating an example of the shaped hook member of hook-and-loop fastener of the present invention. A plurality of, preferably a large number of (about 90 to 160/cm$^2$) hook-type engaging elements (2) rise from a surface of a base plate (1). As shown in FIG. 1, the plurality of hook-type engaging elements are arranged in rows extending in the same direction as the curving direction of the hook-type engaging elements (the hook-type engaging elements in the front row shown in FIG. 1 are curved toward the direction Q shown in FIG. 1), and the curving direction of the hook-type engaging elements in two adjacent rows or two adjacent units each of two or more rows (two adjacent rows in FIG. 1) are opposite to each other (namely, the direction Q shown in FIG. 1 and the direction P shown in FIG. 1). As shown in FIG. 2, each hook-type engaging element is tapered from the proximal end to the distal end, and is curved from a point in the course from the proximal end to the distal end. The distal end is directed toward the base plate.

The resin that forms the shaped hook member of hook-and-loop fastener of the present invention is a semi-aromatic polyamide resin. A semi-aromatic polyamide in the semi-aromatic polyamide resin is typically obtained from an aliphatic diamine and an aromatic dicarboxylic acid or a derivative thereof.

Specific examples of the aliphatic diamine include aliphatic diamines, such as 1,6-hexanediamine, 1,8-octanediamine, 1,9-nonanediamine, 1,10-decanediamine, 1, 11-undecanediamine, 1,12-dodecanediamine, 2-methyl-1,5-pentanecdiamine, 3-methyl-1,5-pentanediamine, 2,2,4-trimethyl-1,6-hexaneediamine, 2,4,4-trimethyl-1,6-hexanediamine, 2-methyl-1,8-octanediamine, and 5-methyl-1,9-nonanediamine.

Among them, 1,9-nonanediamine, or a combination of 1,9-nonanediamine and 2-methyl-1,8-octanediamine is preferably used in terms of the heat resistance and the moldability.

When 1,9-nonanediamine and 2-methyl-1,8-octanediamine are used in combination as an aliphatic diamine, it is preferred that 1,9-nonanediamine and 2-methyl-1,8-octanediamine account for 80 to 100% by mole of the diamine component with a molar ratio of the former to the latter of 40:60 to 95:5 in terms of the heat resistance and the engaging force.

The aromatic dicarboxylic acid which is the other component is preferably an aromatic dicarboxylic acid mainly containing terephthalic acid in terms of the heat resistance and the moldability and further in terms of the engaging force. It is most preferred that terephthalic acid accounts for the whole dicarboxylic acid.

A method for producing the semi-aromatic polyamide used is not particularly limited, and any production method that is commonly known as a method for producing a polyamide can be used. For example, polymerization can be performed, for example, by a solution polymerization method or an interfacial polymerization method using an acid chloride and a diamine as raw materials, or a melt polymerization method, a solid phase polymerization method, or a melt extruder polymerization method using a dicarboxylic acid and a diamine as raw materials.

The semi-aromatic polyamide used in the present invention preferably has an intrinsic viscosity [η] as measured in concentrated sulfuric acid at 30° C., which is a measure of the molecular weight, in the range of 0.7 to 1.5 dl/g in terms of the moldability, and further in terms of the performance of the resulting shaped hook member of hook-and-loop fastener.

In the present invention, for preventing the cutting of the hook-type engaging elements or the crack generation particularly in the curving portion of the engaging elements, during pulling out of the cavities in molding, 2 to 20% by mass of elastomer is added to the semi-aromatic polyamide.

Note that the "cavity", as used herein, means a hollow or recess, and a resin is molded in the "cavity".

The elastomer added is a material that has elasticity or flexibility like in rubber particularly around normal temperature and that is softened under a molding temperature to facilitate the molding. Specific examples thereof include a styrene-based, a vinyl chloride-based, an olefin-based, a urethan-based, an ester-based, and an amide-based elastomer.

Among them, when the elastomer is a polyolefin-based elastomer, particularly a maleic anhydride-modified polyolefin elastomer and the semi-aromatic polyamide is a terminal amino group-containing polyamide derived from 1,9-nonanediamine and 2-methyl-1,8-octanediamine as diamine components and terephthalic acid as a dicarboxylic acid component, the terminal amino group is reacted with the functional group derived from maleic anhydride to increase the integrity of the semi-aromatic polyamide and the elastomer, and the trouble of the phase separation in molding the shaped hook member of hook-and-loop fastener, resulting in the cutting of the hook-type engaging elements in pulling out of the cavities and the crack generation in the process, can be highly prevented.

Note that, in this description, even in the case where the semi-aromatic polyamide is reacted with the elastomer as described above, the semi-aromatic polyamide-derived moiety of the reaction product is considered as the semi-aromatic polyamide and the elastomer-derived moiety thereof is considered as the elastomer.

The amount of the elastomer blended into the semi-aromatic polyamide is required to be 2 to 20% by mass based on 100% by mass of the semi-aromatic polyamide. With an amount less than 2% by mass, the effect of the addition is not exhibited, and with an amount exceeding 20% by mass, the molten resin blended has too high viscosity, making it difficult to pressure-inject the resin into the cavities. The amount is preferably in the range of 4 to 16% by mass, more preferably in the range of 5 to 14% by mass, further preferably in the range of 5 to 13% by mass, particularly preferably in the range of 5 to 10% by mass, and most preferably in the range of 7 to 10% by mass.

Of course, any component other than the semi-aromatic polyamide and the elastomer (for example, carbon black as described later, a resin other than the semi-aromatic polyamide and the elastomer, various stabilizers, or a colorant) may be blended. The total mass of the two components of the semi-aromatic polyamide and the elastomer is preferably 80% by mass or more based on the mass of the entire semi-aromatic polyamide resin ("semi-aromatic polyamide"+"elastomer"+"other components"), more preferably 90% by mass or more, further preferably 99.5% by mass or more, and may be 100% by mass (that is, only the two components of the semi-aromatic polyamide and the elastomer are contained), or may be 100% by mass or less, or may be 99.9% or less.

Furthermore, carbon black is preferably added to the elastomer-blended semi-aromatic polyamide resin in terms of prevention of crack and breakage due to ultraviolet light, and in terms of possibility of cost reduction due to increased molding speed, and further in terms of increase in the moldability. The amount of carbon black added is preferably in the range of 0.1 to 0.5% by mass based on 100% by mass of the total amount of the semi-aromatic polyamide and the elastomer.

A polyurethane primer which is a different resin is preferably laminated on the back surface of the base plate of the shaped hook member of hook-and-loop fastener in terms of a superior adhesion of the shaped hook member of hook-and-loop fastener formed of the semi-aromatic polyamide resin of the present invention, via an adhesive, to an adherent formed of the same semi-aromatic polyamide resin. In particular, a primer formed of an ether-based polyurethane is preferably laminated.

The shaped hook member of hook-and-loop fastener of the present invention is produced using the elastomer-blended semi-aromatic polyamide resin. As a specific method, a method is used in which the molten resin is poured in a sheet form on a surface of a metal roll provided on the surface with a plurality of, preferably a large number of (about 90 to 160/cm$^2$) engaging element-shaped cavities, and at the same time, the molten resin is pressure-injected into the cavities, and after solidification, the resin is peeled from the metal roll surface, and at the same time, the resin is pulled out of the cavities, thereby producing a resin sheet having on a surface thereof a plurality of, preferably a large number of (about 105 to 145/cm$^2$) male-type engaging elements.

More specifically, a ring-shaped die having a thickness of 0.2 to 0.5 mm and having hook-type engaging element shapes carved on the outer circumference thereof, a metal ring that does not have such a carved shape, a ring-shaped die having a thickness of 0.2 to 0.5 mm and having hook-type engaging element shapes carved on the outer circumference thereof, the latter hook-type engaging element shapes being curved opposite to the direction in the former hook-type engaging element shapes, and a metal ring that does not have such a carved shape are sequentially superposed, whereby a die roll having on the outer circumferential surface a plurality of, preferably a large number of (about 105 to 145/cm$^2$) hook-type engaging element-shaped cavities and hook-type engaging element cavities curved toward the opposite direction is provided.

Note that, although the above description describes a case where a ring-shaped die having hook-type engaging element-shaped cavities and a ring-shaped die having hook-type engaging element-shaped cavities with the opposite direction are superposed one by one, the ring-shaped dies may be superposed on a unit-by-unit basis, each unit being of two or more ring dies.

In such a metal roll, on a surface thereof, a plurality of cavities curved in the roll circumferential direction are arranged in rows extending in the circumferential direction, and a plurality of such rows are present in the width direction of the metal roll, and the curving directions of the cavities in two adjacent rows or two adjacent units each of two or more rows are opposite to each other.

In this case, the configuration in which the cavities are each tapered from the metal roll surface to the distal end, and are each curved from a point in the course from the metal roll surface to the distal end in the metal roll circumferential direction, and the distal end is directed toward the metal roll surface is preferred in the case where the resin for molding is a semi-aromatic polyamide for preventing the cutting of the engaging elements or the crack generation in the curved portions in pulling the male-type engaging elements out of the cavities.

A specific method for pouring the molten elastomer-blended semi-aromatic polyamide resin on the metal roll surface to mold the resin is as follows. The molten elastomer-blended semi-aromatic polyamide resin is extruded into a gap between the metal roll and another drum roll disposed at a position opposite to the metal roll and is pressed, thereby filling the cavities with the elastomer-blended semi-aromatic polyamide resin and at the same time, forming a sheet having a uniform thickness on the roll surface. While the die roll is still rotated, the elastomer-blended semi-aromatic polyamide resin in the cavities is solidified by cooling with a refrigerant which is always circulated in the roll. The sheet is stretched with a nip roller having an adjusted gap so that the base plate of the resulting shaped hook member of hook-and-loop fastener has a uniform thickness. The cooled sheet is peeled from the die roll surface, and at the same time, hook-type engaging elements are pulled out of the cavities. Thus, a sheet-shaped body having on the surface a plurality of, preferably a large number of (about 105 to 145/cm$^2$) hook-type engaging elements is obtained.

The thus-obtained shaped hook member of hook-and-loop fastener satisfies:

(1) the hook-type engaging elements are each tapered from the proximal end to the distal end, and are each curved from a point in the course from the proximal end to the distal end, and the distal end is directed toward the base plate; and (2) a plurality of hook-type engaging elements are arranged in rows extending in the same direction as the curving direction of the hook-type engaging elements, and the curving direction in two adjacent rows or two adjacent units each of two or more rows are opposite to each other.

Note that the specific degree to which the distal end of the hook-type engaging element is directed toward the base plate is preferably such a degree that the lower end of the hook-type engaging element at the distal end is 2 to 8% closer to the base plate than the lower end of the hook-type engaging element in the top portion based on the height of the hook-type engaging element. When described with reference to the appended drawing, this means $100\times(H_1-H_2)/H_0=2-8$ in FIG. 2. Note that $H_0$ represents the height of the hook-type engaging elements form the base plate, $H_1$ represents the height of the lower end of the hook-type engaging element in the top portion from the base plate, $H_2$ represents the height of the lower end of the hook-type engaging element at the distal end from the base plate. The values are each calculated as the average of the values in ten arbitrarily selected hook-type engaging elements.

Figure 3:
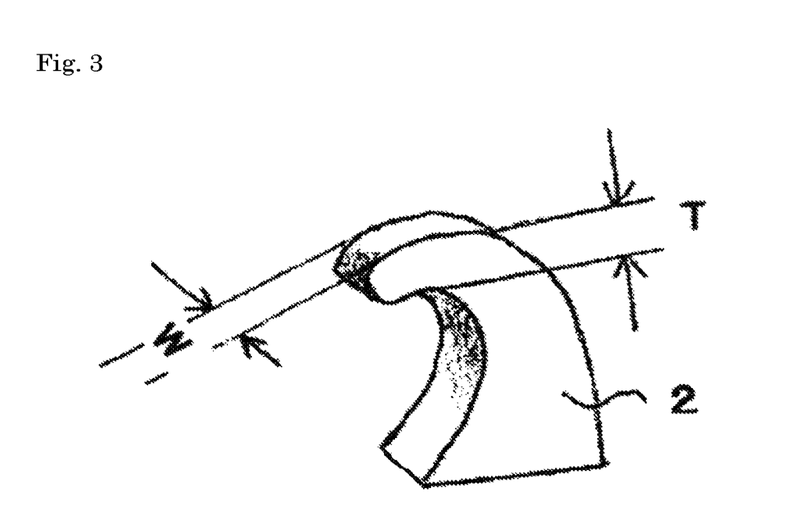
FIG. 3 is a perspective view illustrating an example of the hook-type engaging element constituting the shaped hook member of hook-and-loop fastener of the present invention.

In the present invention, the cross-sectional shape of the hook-type engaging element in the top portion is preferably a shape in which the width of the hook-type engaging element is larger than the thickness of the hook-type engaging element as described above. This will be specifically described with reference to the appended drawing. FIG. 3 is an enlarged view of an example of the hook-type engaging element of the shaped hook member of hook-and-loop fastener of the present invention. The above description means that the width (W) of the hook-type engaging element in the hook-type engaging element top portion is larger than the thickness (T) of the hook-type engaging element therein, namely, W>T, in FIG. 3. By satisfying this, as described above, the cutting of the hook-type engaging elements and the crack generation in the curved portions of the engaging elements can be prevented in pulling out of the cavities in molding the shaped hook member of hook-and-loop fastener. The values are each the average of the values in ten arbitrarily selected hook-type engaging elements like in the above description.

In the present invention, in a preferred size of the hook-type engaging elements, based on the shape in FIG. 2, a height ($H_0$) of the hook-type engaging elements is 1.0 to 2.0 mm, a range (A) at the proximal end is 0.7 to 1.3 mm, and a range (B) at a height of ⅔ the height of the engaging element from the proximal end is 0.15 to 0.4 mm, and the hook-type engaging element preferably begins to curve at a height around ½ to ¾ the height of the engaging element from the proximal end.

The width (W) of the hook-type engaging element in the top portion of the hook-type engaging element shown in FIG. 3 is preferably 0.2 to 0.4 mm, and the width of the hook-type engaging element may be the same from the proximal end of the hook-type engaging element to the distal end thereof, or may be tapered toward the distal end. When such a ring-shaped die as described above is used, the width of the hook-type engaging element is inevitably almost the same from the proximal end of the hook-type engaging element to the distal end thereof. The thickness (T) of the hook-type engaging element in the top portion is preferably 0.15 to 0.35 mm which is smaller than the W mentioned above.

Of course, each of the hook-type engaging elements constituting the shaped hook member of hook-and-loop fastener of the present invention forms one line to the distal end, and is not divided into two or more lines in the middle.

The base plate which is a base from which the hook-type mating elements rise preferably has a thickness in the range of 0.1 to 0.3 mm in terms of the flexibility and the strength. The density of the hook-type engaging elements present on the base plate is preferably in the range of 60 to 160/cm$^2$, and particularly preferably in the range of 80 to 140/cm$^2$.

In the shaped hook member of hook-and-loop fastener of the present invention, a plurality of such hook-type engaging elements as described above are arranged in rows extending in the same direction as the curving direction of the hook-type engaging elements as shown in FIG. 1, and the interval (C) between the hook-type engaging elements adjacent in the row direction is preferably 1.2 to 2.2 mm, in other words, the hook-type engaging element is preferably present every 1.2 to 2.2 mm in the row length. The hook-type engaging element is more preferably present every 1.3 to 1.8 mm. The interval between the adjacent engaging element rows is preferably in the range of 0.4 to 1.0 mm, in other words, one row of the hook-type engaging elements is preferably present in a width of the base plate of 0.4 to 1.0 mm. One row of the hook-type engaging elements is more preferably present in a width of 0.5 to 0.8 mm.

The shaped hook member of hook-and-loop fastener of the present invention, which is superior in the engaging performance at high temperature, is suitable for fixation of an automotive interior material, particularly for fixation of a ceiling material or fixation in the engine room. Besides, the shaped hook member of hook-and-loop fastener filter is also suitable for fixation of a filter in a combustion furnace, fixation of an insulating material for high temperature fluid piping, and fixation of an appliance used under a high temperature condition, as well as clothes, globes, a helmet, shoes, and the like used in a high temperature workplace.

EXAMPLES

The present invention will be described in detail below with reference to examples. In the examples, the engaging force (engaging force at normal temperature) of the shaped hook member of hook-and-loop fastener was measured according to the method of JIS L3416:2000, and the engaging force at high temperature was measured at 120° C. according to the method of JIS L3416:2000. Both the engaging forces were measured using a woven polyphenylenesulfide hook-and-loop fastener ["MAGICTAPE" (registered tradename) B48000.00 manufactured by Kuraray Fastening Co., Ltd.] as loop-shaped engaging elements to be engaged.

Furthermore, the engaging force after leaving at high temperature was measured by leaving the shaped hook member of hook-and-loop fastener under a temperature condition of 120° C. for one month, and measuring the engaging force at the end point at a normal temperature using the aforementioned woven polyphenylesulfide hook-and-loop fastener ["MAGICTAPE" (registered tradename) B48000.00 manufactured by Kuraray Fastening Co., Ltd.] as loop-shaped engaging elements to be engaged.

The tensile shear strength (adhesion at normal temperature) was measured as follows. Two sample hook-and-loop fasteners of 25 mm width and 100 mm length were provided. The sample hook-and-loop fasteners were both used in an orientation of the engaging elements along the longitudinal direction (MD) in production. The two hook-and-loop fasteners were superposed 50 mm in length, and were engaged by two reciprocations of a roller of 2 kg to thus provide a specimen for tensile shear strength measurement.

The engaged two hook-and-loop fasteners were attached to a chuck of a tensile tester (Autograph AGS-100B manufactured by Shimadzu Corporation), and the tensile tester was operated at a speed of 300 mm/min to measure the maximum tensile shear load until separation, and the tensile shear strength per unit area was calculated based on the obtained value.

Furthermore, the tensile shear strength (adhesion) after leaving at high temperature was measured by leaving the shaped hook member of hook-and-loop fastener on a temperature condition of 120° C. for one month, and measuring the tensile shear strength at the end point at a normal temperature using the aforementioned woven polyphenylenesulfide hook-and-loop fastener ["MAGICTAPE" (registered tradename) B48000.00 manufactured by Kuraray Fastening Co., Ltd.] as loop-shaped engaging elements to be engaged.

Then, whether any hook-type engaging elements were cut or had any cracks and whether any loop-shaped engaging elements of loop-type hook-and-loop fastener to be engaged were cut were observed by enlarging the engaging element faces using a microscope.

Example 1

[Provision of Resin for Molding]

A terminal amino group-containing semi-aromatic polyamide ("Genester" (registered tradename) manufactured by Kuraray, Co., Ltd., [η]=1.20 dl/g), which is obtained by using a mixed diamine in which 1,9-nonanediamine constitutes 50% by mole of the diamine component and 2-methyl-1,8-octanediamine constitutes 50% by mole thereof and using terephthalic acid as an aromatic dicarboxylic acid component, was used as a semi-aromatic polyamide, and a maleic anhydride-modified polyolefin elastomer ("TAFMER" (registered tradename) manufactured by Mitsui Chemicals, Inc.) was added as an elastomer in a ratio of 10% by mass based on 100% by mass of the semi-aromatic polyamide, and 0.2% by mass of carbon black powder was further added based on 100% by mass of the total amount of the semi-aromatic polyamide and the elastomer, followed by mixing to produce pellets.

[Provision of die for molding]

A ring-shaped die having a thickness of 0.30 mm and a diameter of 212 mm and having hook-type engaging element shapes carved on the outer circumference, a metal ring having a thickness 0.30 mm and a diameter of 212 mm and having a flat outer circumference with no such shapes carved, a ring-shaped die having a thickness of 0.30 mm and a diameter of 212 mm and having hook-type engaging element shapes carved on the outer circumference, the latter hook-type engaging element shapes being directed opposite to the direction of the former hook-type engaging element shapes, and a metal ring having a thickness 0.30 mm and a diameter of 212 mm and having a flat outer circumference with no such shapes carved were sequentially superposed. In this manner, a die roll having a width of 120 mm and having on the outer circumference surface a large number of (about 105 to 115/cm$^2$) hook-type engaging element-shaped cavities and hook-type engaging element-shaped cavities directed to the opposite direction was provided as a die.

[Production of Shaped Hook Member of Hook-and-Loop Fastener]

The resin pellets obtained by adding the elastomer and carbon black to the semi-aromatic polyamide were molten, and the molten resin (temperature: 310° C.) was extruded into a gap between the die roll and another drum roll disposed at a position opposite to the die roll, and was pressed, thereby filling the cavities with the resin and at the same time, forming a sheet having a uniform thickness on the roll surface. While the die roll was still rotated, the resin in the cavities was cooled with water which was always circulated in the roll. The sheet was stretched with a nip roller having a gap adjusted so as to give the base plate thickness of 0.20 mm, and at the same time, the cooled solidified sheet was peeled from the die roll surface, whereby a shaped hook member of hook-and-loop fastener was produced.

[Shape and Performance of the Obtained Shaped Hook Member of Hook-and-Loop Fastener]

The obtained shaped hook member of hook-and-loop fastener had a shape as shown in FIG. 1, specifically, a shape having a large number (about 105 to 115/cm$^2$) of hook-type engaging elements which were each tapered from the proximal end to the distal end, and were each curved from a point in the course thereof, the distal end being directed toward the base plate, the plurality of the hook-type engaging elements being arranged in rows extending in the same direction as the curving direction of the hook-type engaging elements, the curving direction in two adjacent rows being opposite to each other.

The male-type engaging elements had a shape as shown in FIG. 2, in which the height ($H_0$) was 1.25 mm from the base plate surface, the height ($H_2$) of the lower end of the hook-type engaging element at the distal end was closer to the base plate than the height ($H_1$) of the lower end of the hook-type engaging element in the top portion by a distance corresponding to 5% of the height ($H_0$) of the hook-type engaging element.

The width (W) of the hook-type engaging element in the top portion was 0.30 mm, and the thickness (T) of the hook-type engaging element in the top portion was 0.23 mm, the range (A) of the engaging element in the proximal end was 0.98 mm, and the range (B) at a height of ⅔ the height of the engaging element was 0.27 mm. The hook-type engaging element begun to curve around a height of ⅔ the height of the engaging element from the proximal end, the density of the hook-type engaging elements was 110/cm², the thickness of the base plate was 0.20 mm, the interval (C) between hook-type engaging elements adjacent in the row direction was 1.47 mm, and the interval between adjacent rows of the engaging elements was 0.60 mm.

The hook-type engaging element face of the shaped hook member of hook-and-loop fastener was observed with a microscope. Then, no cut hook-type engaging element nor cracked hook-type engaging element was observed, and the engaging force was quite good both at a normal temperature and under a high temperature condition of 120° C. as shown in Table 1. In addition, there was no problem also in the engaging force after leaving under a temperature condition of 120° C. for one month. In addition, engaging and peeling were repeated 1000 times at a normal temperature. Then, the loop-type engaging elements of the female-type hook-and-loop fastener to be engaged were hardly cut.

Examples 2 to 3 and Comparative Examples 1 to 2

A shaped hook member of hook-and-loop fastener was produced in the same manner as in Example 1 except that the amount of the elastomer blended in Example 1 was changed to 5% by mass (Example 2), 15% by mass (Example 3), 1% by mass (Comparative Example 1), or 22% by mass (Comparative Example 2).

In Comparative Example 1, a crack was generated in the hook-and-loop fastener sheet when peeled from the metal roll surface and a continuous sheet could not be obtained. Also in Comparative Example 2, due to the too high melt viscosity, the molten resin could not be poured on the metal roll surface in a sheet form and the resin could not be pressure-injected into the cavities. Thus a hook-and-loop fastener sheet could not be obtained.

The obtained shaped hook members of hook-and-loop fasteners of Examples 2 to 3 had the same size, shape, and the like of the engaging elements as those in Example 1. In the shaped hook member of hook-and-loop fastener of Example 2, however, some but a few distal ends of the hook-type engaging elements were cut, and it was presumed that the distal ends were cut during pulling out of the cavities.

In Example 3, a few hook-type engaging elements did not extend to the distal ends and it is presumed that this was caused because the resin did not reach the distal end of the cavities.

Regarding the engaging force, as shown in Table 1, Example 2 and Example 3 were slightly poorer than Example 1 but had excellent values which were almost comparable to Example 1 at a normal temperature and under a high temperature condition of 120° C. Also in the engaging force after leaving at a high temperature for a long period of time, Example 2 and Example 3 had excellent performance as in Example 1. The state of the loop-shaped engaging elements of the loop hook-and-loop fastener to be engaged after repeating engaging and peeling 1000 times was observed. Then, almost no cut was caused like in Example 1.

Example 4

A shaped hook member of hook-and-loop fastener was produced in the same manner as in Example 1 except that the elastomer in Example 1 was replaced with a styrene-based elastomer ("SEPTON" (registered tradename) 1020 manufactured by Kuraray, Co., Ltd.).

The obtained shaped hook member of hook-and-loop fastener was hardly different from that of Example 1 in the size and shape, but a few engaging elements were cut at the middle thereof. Furthermore, the engaging force after leaving at high temperature for a long period of time was also considerably poorer than that of Example 1, but was not too poor for a heat resistant hook-and-loop fastener.

Furthermore, the engaging force at normal temperature and the engaging force at 120° C. were considerably poorer than those in Example 1. The engaging force after leaving at a high temperature for a long period of time was also considerably poorer than that in Example 1, but was not too poor for a heat resistant hook-and-loop fastener. Note that, after repeating engaging and peeling 1000 times, the cut in the loop-shaped engaging elements of the loop-type hook-and-loop fastener to be engaged was hardly observed like in Example 1.

TABLE 1

| | | Example 1 | Example 2 | Example 3 | Example 4 |
|---|---|---|---|---|---|
| Engaging force at normal temperature | Tensile shear strength (N/cm²) | 54.8 | 62.5 | 42.2 | 51.1 |
| | Peeling strength (N/cm) | 3.67 | 3.02 | 2.77 | 3.12 |
| Engaging force at 120° C. | Tensile shear strength (N/cm²) | 21.9 | 24.1 | 16.7 | 18.8 |
| | Peeling strength (N/cm) | 2.03 | 1.87 | 1.25 | 1.56 |
| Engaging force | Tensile shear | 56.9 | 60.5 | 42.9 | 48.3 |

TABLE 1-continued

| | | Example 1 | Example 2 | Example 3 | Example 4 |
|---|---|---|---|---|---|
| after leaving at 120° C. for 1 month | strength (N/cm$^2$) Peeling strength (N/cm) | 3.49 | 3.12 | 2.78 | 2.89 |
| State of loop-shaped engaging elements of loop-type hook-and-loop fastener after repeating engaging and peeling 1000 times | | Almost no damage | A few loop cuts | Almost no damage | Almost no damage |

Example 5

A polyether-based polyurethane aqueous primer (HYDRAN WLS-201) manufactured by DIC Corporation was applied to a region of 25 mm×25 mm on the back surface of the shaped hook member of hook-and-loop fastener obtained in Example 1. An adhesive, a cyanoacrylate monomer (W200X) manufactured by ALTECO Inc. was applied between two hook-and-loop fasteners thus obtained. The two hook-and-loop fasteners were superposed 25 mm in length, were pressed 10 seconds with a load of 2 kg, and then were aged for 24 hours. The tensile shear strength was measured with a tensile tester at a speed of 50 mm/min according to the method for measuring the tensile shear strength (adhesion at normal temperature) described above. Then, the adhesion strength was 140 N/cm$^2$ and thus, a strong adhesion was obtained.

Example 6

Two shaped hook members of hook-and-loop fasteners obtained in Example 1 were bonded without applying the polyether-based polyurethane aqueous primer (HYDRAN WLS-201) manufactured by DIC Corporation on the back surface thereof and only with an adhesive manufactured by ALTECO Inc. The tensile shear strength (adhesion at normal temperature) thereof was measured in the same manner as in Example 5. Then, the adhesion strength was 96 N/cm$^2$. The performance was thus poorer than the fasteners with the primer applied but was a level acceptable for use with no problem.

Comparative Example 3

[Change in Material of Shaped Hook Member of Hook-and-Loop Fastener]

A shaped hook member of hook-and-loop fastener was produced in the same production condition as in Example 1 except that the material of the shaped hook member of hook-and-loop fastener was changed from the semi-aromatic polyamide to nylon 6. A polyether-based polyurethane aqueous primer (HYDRAN WLS-201) manufactured by DIC Corporation was applied to a region of 25 mm×25 mm of the back surface of each of two shaped hook members of hook-and-loop fasteners thus obtained. An adhesive, a cyanoacrylate monomer (W200X) manufactured by ALTECO Inc. was further applied between the two shaped hook members of hook-and-loop fasteners. The tensile shear strength (adhesion at normal temperature) was measured in the same manner as in Example 5. Then, the adhesion strength was 58 N/cm$^2$, which was considerably poorer than that of Example 5 and was not an acceptable level for use.

Comparative Example 4

Two shaped hook members of hook-and-loop fasteners produced in the same manner as in Comparative Example 3 were bonded without applying the polyether-based polyurethane aqueous primer (HYDRAN WLS-201) manufactured by DIC Corporation on the back surface thereof and only with an adhesive manufactured by ALTECO Inc. The tensile shear strength (adhesion at normal temperature) thereof was measured in the same manner as in Comparative Example 3. Then, the adhesion strength was 76 N/cm$^2$. The performance was thus higher than that with the primer applied, but was considerably poorer than that of Examples 5 and 6 and was not an acceptable level for use.

TABLE 2

| | | Example 5 | Example 6 | Comparative Example 3 | Comparative Example 4 |
|---|---|---|---|---|---|
| Adhesion at normal temperature | Tensile shear strength (N/cm$^2$) | 140 | 96 | 58 | 76 |

REFERENCE SIGNS LIST

1: Base plate
2: Hook-type engaging element
$H_0$: Height of hook-type engaging element
$H_1$: Height of lower end of hook-type engaging element in top portion
$H_2$: Height of lower end of hook-type engaging element at distal end
A: Range at engaging element proximal end
B: Range at a height of ⅔ the height of engaging element
C: Interval between hook-type engaging elements adjacent in row direction
W: Width of hook-type engaging element in top portion of hook-type engaging element
T: Thickness of hook-type engaging element in top portion of hook-type engaging element

The invention claimed is:
1. A shaped hook member of hook-and-loop fastener comprising:
a base plate, and
a plurality of hook-type engaging elements that rise from a surface of the base plate,
wherein the shaped hook member satisfies conditions (1) to (3):

(1) the hook-type engaging elements are each tapered from a proximal end to a distal end, and are each curved from a point in a course from the proximal end to the distal end, and the distal end is directed toward the base plate;
(2) the plurality of hook-type engaging elements are arranged in rows extending in the same direction as the curving direction of the hook-type engaging elements, and the curving directions of the hook-type engaging elements in two adjacent rows or two adjacent units each of two or more rows are opposite to each other; and
(3) the base plate and the hook-type engaging element are formed of a resin, the resin being a semi-aromatic polyamide resin comprising a semi-aromatic polyamide and 2 to 20% by mass of an elastomer based on 100% by mass of the semi-aromatic polyamide.

2. The shaped hook member according to claim 1, wherein a top portion of each of the hook-type engaging elements has a cross-sectional shape with a width of the hook-type engaging element and a thickness of the hook-type engaging element, the width being larger than the thickness.

3. The shaped hook member according to claim 1, wherein a lower end of the hook-type engaging element at the distal end is 2 to 8% closer to the base plate than a lower end of the hook-type engaging element in the top portion based on a height of the hook-type engaging element.

4. The shaped hook member according to claim 1, wherein the semi-aromatic polyamide is a polyamide derived from 1,9-nonanediamine and terephthalic acid as main components.

5. The shaped hook member according to claim 1, wherein the semi-aromatic polyamide is a terminal amino group-containing semi-aromatic polyamide derived from 1,9-nonanediamine and 2-methyl-1,8-octanediamine as diamine components and terephthalic acid as a dicarboxylic acid component, and
wherein the elastomer is a maleic anhydride-modified polyolefin elastomer.

6. The shaped hook member according to claim 1, wherein the semi-aromatic polyamide resin comprises carbon black.

7. The shaped hook member according to claim 1, wherein a polyurethane primer is laminated on a back surface of the base plate.

8. A method for producing a shaped hook member of hook-and-loop fastener, the method comprising covering a surface of a metal roll that has on the surface a plurality of hook-type engaging element-shaped cavities satisfying the following conditions (4) and (5) with a molten resin satisfying condition (6) in a sheet form, and at the same time, pressure-injecting the molten resin into the cavities, and after the pressure-injected resin is solidified, peeling the sheet-shaped resin from the surface of the metal roll, and at the same time, pulling the solidified resin out of the cavities:
(4) the cavities are each tapered from the surface of the metal roll to a distal end, and are each curved from a point in a course from the surface of the metal roll to the distal end in a circumferential direction of the metal roll, and the distal end is directed toward the surface of the metal roll;
(5) on the surface of the metal roll, the plurality of cavities are arranged in rows extending in the circumferential direction of the metal roll, the rows are a plurality of rows present in a width direction of the metal roll, and the curving direction of the cavities in two adjacent rows or two adjacent units each of two or more rows are opposite to each other;
(6) the molten resin is a semi-aromatic polyamide resin comprising a semi-aromatic polyamide and 2 to 20% by mass of an elastomer based on 100% by mass of the semi-aromatic polyamide.

9. A method for fixing an automotive interior material, the method comprising fixing the automotive interior material on a car ceiling with the shaped hook member according to claim 1.

* * * * *